(12) United States Patent
Umetsu et al.

(10) Patent No.: US 12,517,032 B2
(45) Date of Patent: Jan. 6, 2026

(54) PARTICLE ANALYZER AND PARTICLE ANALYSIS METHOD

(71) Applicant: Sony Group Corporation, Tokyo (JP)

(72) Inventors: Tomoyuki Umetsu, Tokyo (JP); Shin Masuhara, Tokyo (JP)

(73) Assignee: Sony Group Corporation, Tokyo (JP)

( * ) Notice: Subject to any disclaimer, the term of this patent is extended or adjusted under 35 U.S.C. 154(b) by 149 days.

(21) Appl. No.: 18/282,883

(22) PCT Filed: Mar. 15, 2022

(86) PCT No.: PCT/JP2022/011661
§ 371 (c)(1),
(2) Date: Sep. 19, 2023

(87) PCT Pub. No.: WO2022/209859
PCT Pub. Date: Oct. 6, 2022

(65) Prior Publication Data
US 2024/0167932 A1 May 23, 2024

(30) Foreign Application Priority Data
Mar. 30, 2021 (JP) .................. 2021-057969

(51) Int. Cl.
*G01N 15/14* (2024.01)
*G01N 15/1404* (2024.01)
(Continued)

(52) U.S. Cl.
CPC ..... *G01N 15/1404* (2013.01); *G01N 15/1425* (2013.01); *G01N 15/1434* (2013.01); *G01N 15/149* (2024.01); *G01N 2015/1006* (2013.01)

(58) Field of Classification Search
CPC ............. G01N 15/1404; G01N 15/1492
See application file for complete search history.

(56) References Cited

U.S. PATENT DOCUMENTS

| 3,826,364 A | 7/1974 | Bonner et al. |
| 4,325,483 A | 4/1982 | Lombardo et al. |

(Continued)

FOREIGN PATENT DOCUMENTS

| JP | S49-109093 A | 10/1974 |
| JP | 2015-152439 A | 8/2015 |

(Continued)

OTHER PUBLICATIONS

International Search Report and English translation thereof mailed Apr. 26, 2022 in connection with International Application No. PCT/JP2022/011661.

*Primary Examiner* — Tony Ko
(74) *Attorney, Agent, or Firm* — Wolf, Greenfield & Sacks, P.C.

(57) ABSTRACT

There is provided a technology for improving analysis accuracy and sorting accuracy in a technology for analyzing and sorting particles.
In the present technology, there is provided a particle analyzer including: a vibration unit that applies vibration to a fluid including a sample flow which contains a particle and a sheath flow which flows so as to include the sample flow to form a droplet in the fluid; a charging unit that applies electric charge to the droplet including the particle; a side stream imaging unit that images a state of the droplet deflected by the electric charge; and a charging control unit that controls a timing of charging on the basis of an image captured by the side stream imaging unit.

13 Claims, 13 Drawing Sheets

(51) Int. Cl.
    *G01N 15/1434*     (2024.01)
    *G01N 15/149*     (2024.01)
    *G01N 15/10*     (2006.01)

(56) References Cited

U.S. PATENT DOCUMENTS

| | | | |
|---|---|---|---|
| 11,492,586 B2 * | 11/2022 | Kanda | C12M 47/04 |
| 2014/0306122 A1 | 10/2014 | Norton et al. | |
| 2015/0068957 A1 | 3/2015 | Otsuka et al. | |
| 2017/0241889 A1 | 8/2017 | Otsuka et al. | |
| 2021/0039111 A1 | 2/2021 | Kanda | |

FOREIGN PATENT DOCUMENTS

| | | |
|---|---|---|
| JP | 2016-057286 A | 4/2016 |
| JP | 2016-521362 A | 7/2016 |
| JP | 2021-025866 A | 2/2021 |
| WO | WO 2014/115409 A1 | 7/2014 |
| WO | WO 2019/191566 A1 | 10/2019 |

\* cited by examiner

PARTICLE ANALYZER AND PARTICLE ANALYSIS METHOD

CROSS-REFERENCE TO RELATED APPLICATIONS

This application claims the benefit under 35 U.S.C. § 371 as a U.S. National Stage Entry of International Application No. PCT/JP2022/011661, filed in the Japanese Patent Office as a Receiving Office on Mar. 15, 2022, which claims priority to Japanese Patent Application Number JP2021-057969, filed in the Japanese Patent Office on Mar. 30, 2021, each of which is hereby incorporated by reference in its entirety.

TECHNICAL FIELD

The present technology relates to a particle analyzer and a particle analysis method.

BACKGROUND ART

Currently, a technology referred to as flow cytometry is used for analyzing particles related to living bodies such as cells and microorganisms. This flow cytometry is an analysis method for analyzing and sorting particles by irradiating particles flowing so as to be included in a sheath flow fed into a flow path formed in a flow cell, a microchip, or the like with light and detecting fluorescence and scattered light emitted from each particle. A device used for this flow cytometry is called as a flow cytometer (referred to as a "cell sorter" in some cases).

In this flow cytometer, a vibration element is generally provided in part of a flow path through which particles included in a sheath flow flows. The vibration element applies vibration to part of the flow path to continuously convert a fluid discharged from a discharge port of the flow path into droplets. Then, the flow cytometer employs a configuration in which the droplet including the particles is charged with predetermined electric charge, the traveling direction of the droplet is changed by a deflection plate or the like on the basis of the electric charge, and only the target particles are recovered in a predetermined vessel, a predetermined place of a predetermined container, or the like.

In the flow cytometer, a control technique for stably forming droplets is one of important factors for improving accuracy of sorting. Here, it is known that when formation of a droplet is unstable, such as when timing of break-off at which a fluid discharged from the discharge port of the flow path is converted into a droplet is unstable, time during which the droplet is charged with electric charge also becomes unstable, and consequently, sorting of particles also becomes unstable. However, in the formation of droplets, a plurality of factors is involved such as environmental conditions such as a flow rate, a temperature, and a humidity, and a size of the particle, and thus it is difficult to control the formation.

In contrast, for example, Patent Document 1 discloses a technology for stabilizing the timing of break-off. In this technology, the magnitude of vibration is controlled according to the distance from a break-off point to a first satellite.

Furthermore, Patent Document 2 discloses a particle analyzer capable of realizing break-off at a stable timing by including at least a flow path that allows passage of a fluid including a sample flow which contains a particle and a sheath flow which flows so as to include the sample flow, a droplet forming unit that applies vibration to the fluid by using a vibration element to form a droplet in the fluid, an electric charge charging unit that charges the droplet including the particle with electric charge, an imaging unit that obtains a photograph of a phase at a certain time, and a control unit that controls a timing at which the droplet breaks off on the basis of the photograph.

CITATION LIST

Patent Document

Patent Document 1: Japanese Patent Application Laid-Open No. 2015-152439
Patent Document 2: Pamphlet of International Publication No. 2019/191566

SUMMARY OF THE INVENTION

Problems to be Solved by the Invention

As described above, there are various technologies for controlling the timing at which a droplet breaks off, but in order to improve the accuracy of sorting, it is also necessary to accurately advance and recover the broken-off droplet in a desired direction, and there is still room for development.

Therefore, a main object of the present technology is to provide a technology for improving analysis accuracy and sorting accuracy in a technology for analyzing and sorting particles.

Solutions to Problems

In the present technology, first, there is provided a particle analyzer including: a vibration unit that applies vibration to a fluid including a sample flow which contains a particle and a sheath flow which flows so as to include the sample flow; a charging unit that applies electric charge to a droplet including the particle, the droplet being formed by the vibration; a side stream imaging unit that images a state of the droplet deflected by the electric charge; and a charging control unit that controls a timing of charging on the basis of an image captured by the side stream imaging unit.

In the present technology, the charging control unit can calculate a distance between side streams from an image captured by the side stream imaging unit, and can determine a phase range in which the distance is constant.

Furthermore, the charging control unit can also determine the timing of the charging in the phase range according to a type of a satellite of the droplet.

At this time, in a case where the satellite is a fast satellite, the charging control unit can determine the timing of the charging near a center in the phase range.

In contrast, in a case where the satellite is a slow satellite, the charging control unit can determine the timing of the charging on a main droplet separation side in the phase range.

The particle analyzer according to the present technology can further include: a droplet imaging unit that images a state of a droplet before being deflected; and a break-off control unit that controls break-off of the droplet on the basis of an image captured by the droplet imaging unit.

In the present technology, the break-off control unit can adjust a voltage of the vibration unit and/or a liquid feeding pressure of the fluid on the basis of a timing of break-off of the droplet specified by a plurality of images captured by the droplet imaging unit.

Furthermore, the break-off control unit can also control a coupled state between the droplet and a liquid column and/or a distance between the droplet and the liquid column by adjusting the voltage of the vibration unit.

Moreover, the break-off control unit can control a break-off position of the droplet by adjusting the liquid feeding pressure of the fluid.

In this case, the break-off control unit can adjust the liquid feeding pressure of the fluid after adjusting the voltage of the vibration unit.

In the present technology, the droplet imaging unit can set a strobe timing according to a type of a satellite of the droplet.

At this time, in a case where the satellite is a fast satellite, the droplet imaging unit can set the strobe timing immediately after the satellite is separated from a liquid column.

In contrast, in a case where the satellite is a slow satellite, the droplet imaging unit can set the strobe timing immediately after a main droplet is separated from a liquid column.

In the present technology, next, there is provided a particle analysis method including: a vibration step of applying vibration to a fluid including a sample flow which contains a particle and a sheath flow which flows so as to include the sample flow; a charging step of applying electric charge to a droplet including the particle, the droplet being formed by the vibration; a side stream imaging step of imaging a state of the droplet deflected by the electric charge; and a charging control step of controlling a timing of charging on the basis of an image captured in the side stream imaging step.

In the present technology, "particles" can broadly include bio-related particles such as cells, microorganisms, and ribosomes, or synthetic particles such as latex particles, gel particles, and industrial particles, and the like.

The bio-related particles include chromosomes forming various cells, ribosomes, mitochondria, organelles (cell organelles) and the like. The cells include animal cells (for example, blood cells and the like) and plant cells. The microorganisms include bacteria such as *Escherichia coli*, viruses such as tobacco mosaic virus, fungi such as yeast, and the like. Moreover, the bio-related particles also include bio-related polymers such as nucleic acids, proteins, complexes thereof, and the like. Furthermore, the industrial particles may be, for example, an organic or inorganic polymer material, metal, and the like. The organic polymer material includes polystyrene, styrene/divinylbenzene, polymethyl methacrylate, and the like. The inorganic polymer material includes glass, silica, a magnetic material, and the like. The metal includes gold colloid, aluminum, and the like. In general, shapes of these particles are normally spherical, but may be non-spherical in the present technology, while the size, mass, and the like thereof are also not particularly limited.

Figure 3:
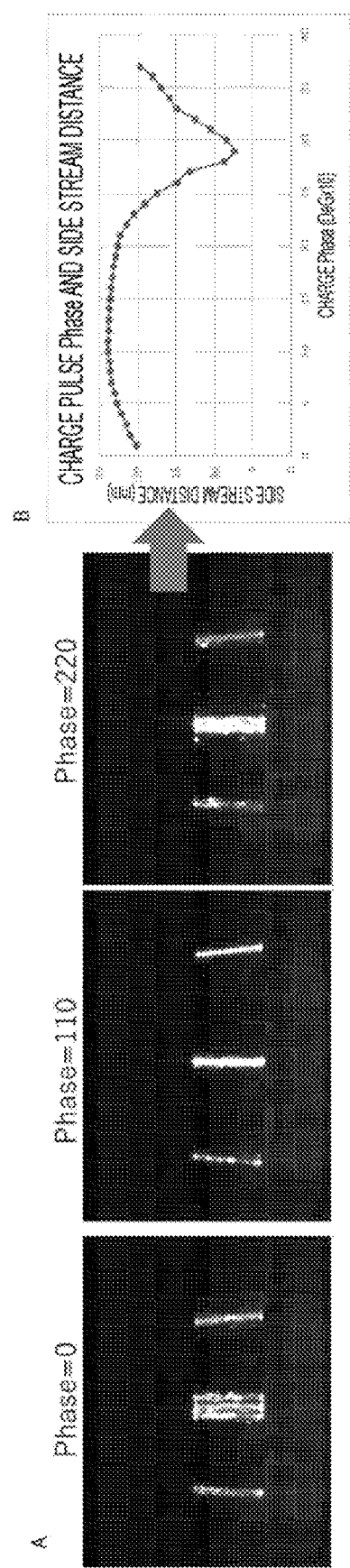

A of FIG. 3 illustrates images obtained by sweeping the phase of a droplet charge signal with respect to a vibration element 111 and imaging a deflected droplet image with a side stream camera. B of FIG. 3 is a graph illustrating a relationship between a distance between side streams and a charge signal.

Figure 4:
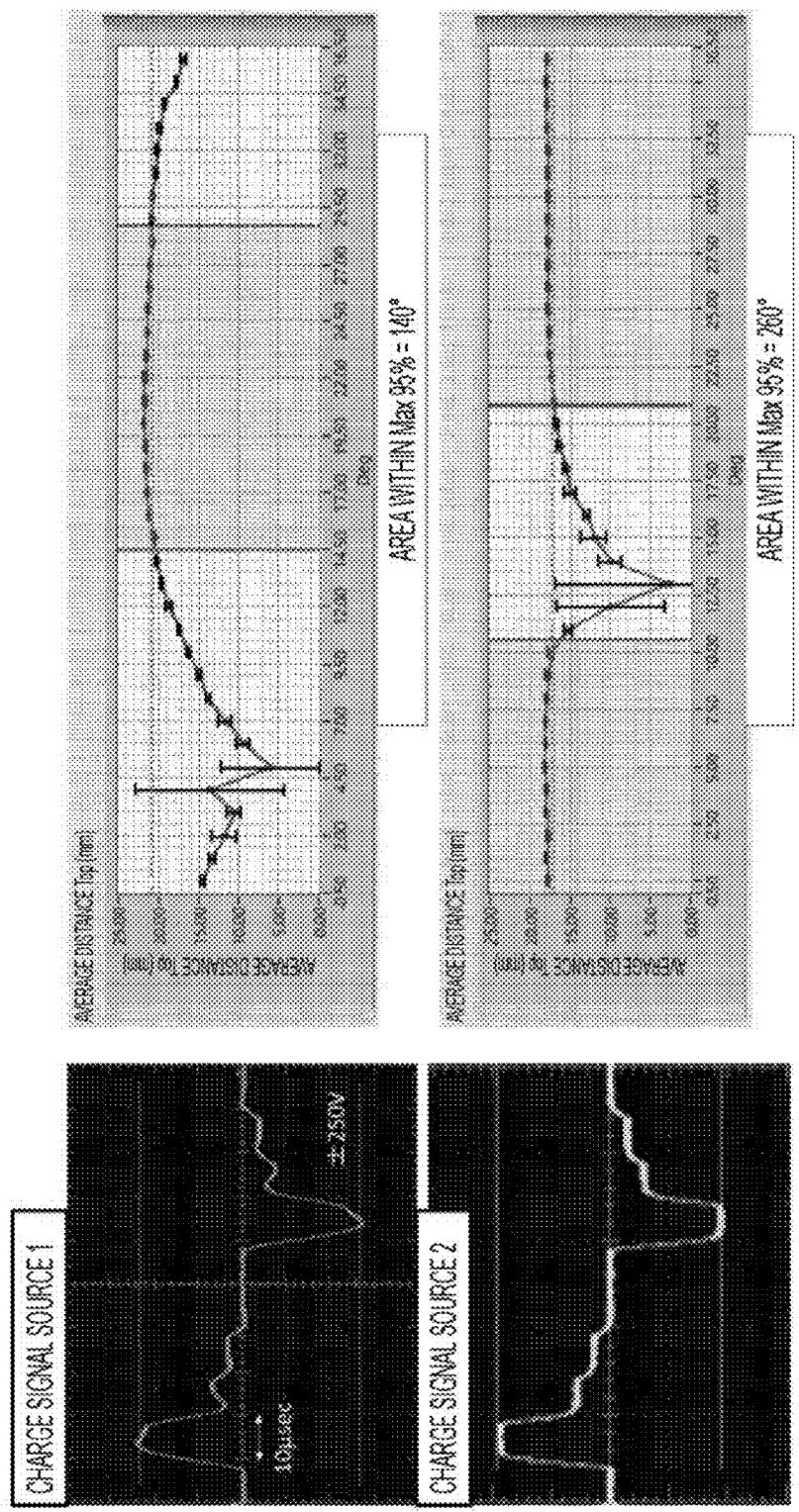

FIG. 4 illustrates graphs illustrating two examples of a charge signal output from amplifiers with different circuits for the same deflection input signal and relationships between a distance between side streams and a charge signal in a case where the respective amplifiers are used.

Figure 5:
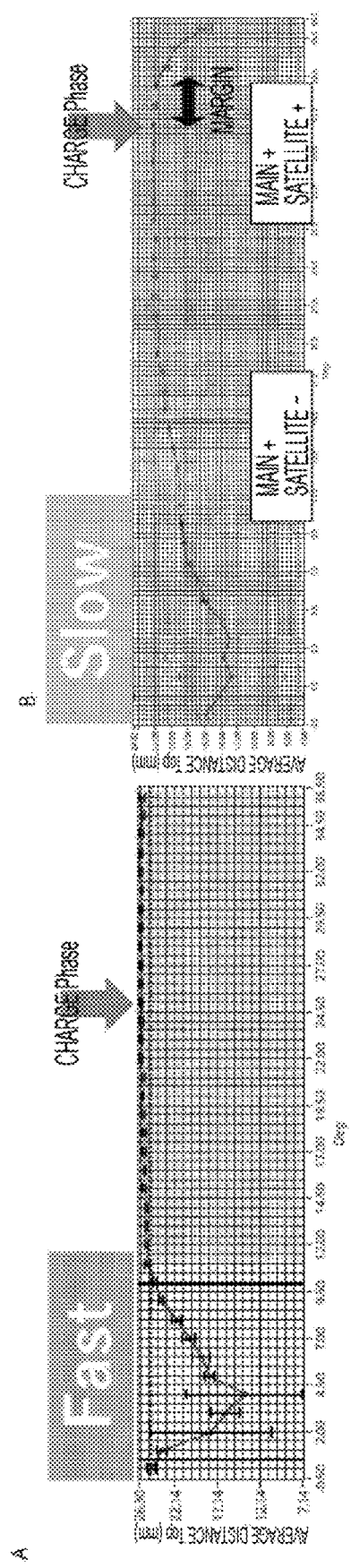

A of FIG. 5 is a graph illustrating a relationship between a distance between side streams and a charge signal in the case of a fast satellite. B of FIG. 5 is a graph illustrating a relationship between a distance between side streams and a charge signal in the case of a slow satellite.

Figure 6:
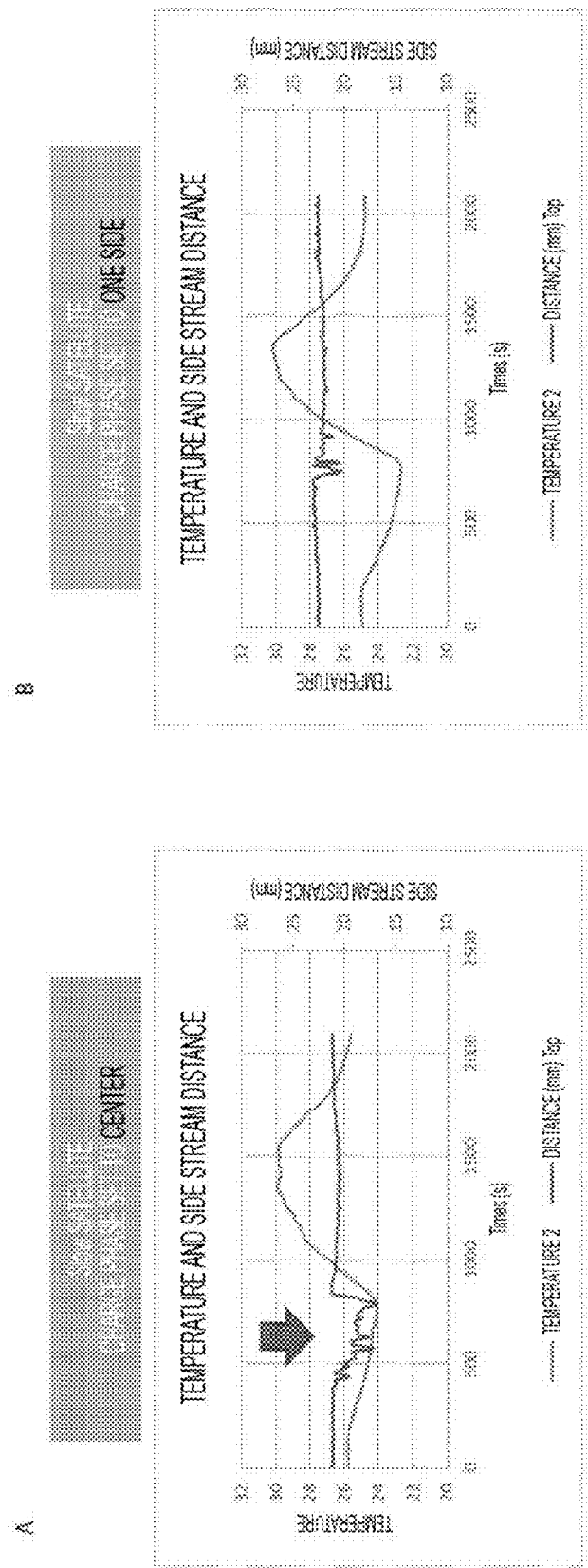

A of FIG. 6 is a graph illustrating a distance between side streams and a temperature change in a case where a condition setting of a charge phase is set near the center of a phase range in which the distance between side streams is constant in the case of a slow satellite. B of FIG. 6 is a graph illustrating a distance between side streams and a temperature change in a case where the condition setting of the charge phase is set to be closer to the main droplet separation timing in the case of a slow satellite.

Figure 7:
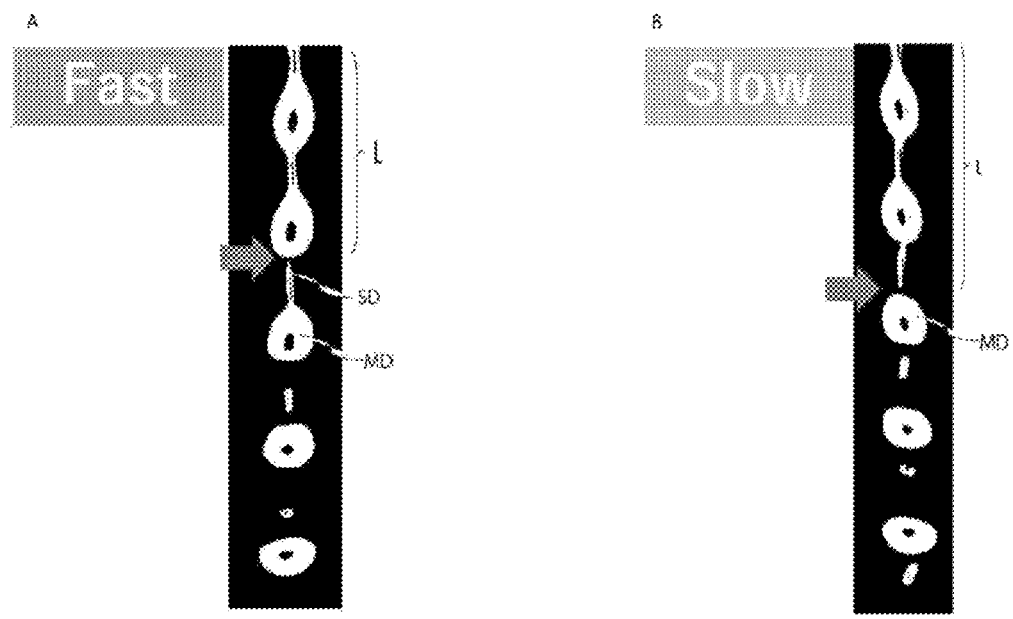

FIG. 7 illustrates examples of a droplet image, in which A illustrates an example of the fast satellite, and B illustrates an example of the slow satellite.

Figure 8:
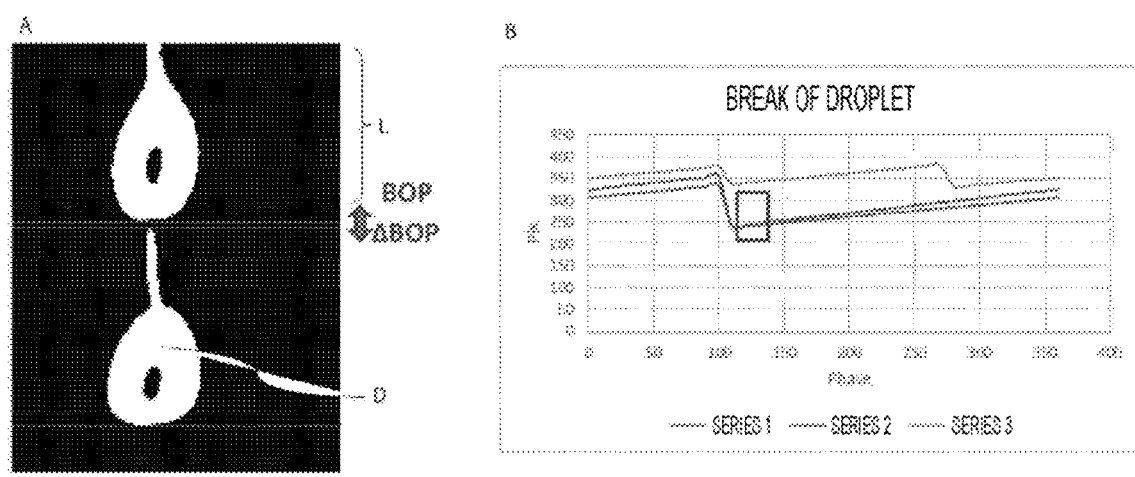

A of FIG. 8 is an example of a droplet image captured by a droplet imaging unit 17, and B of FIG. 8 is a graph illustrating a characteristic amount (break of the droplet D) obtained from the droplet image.

Figure 9:
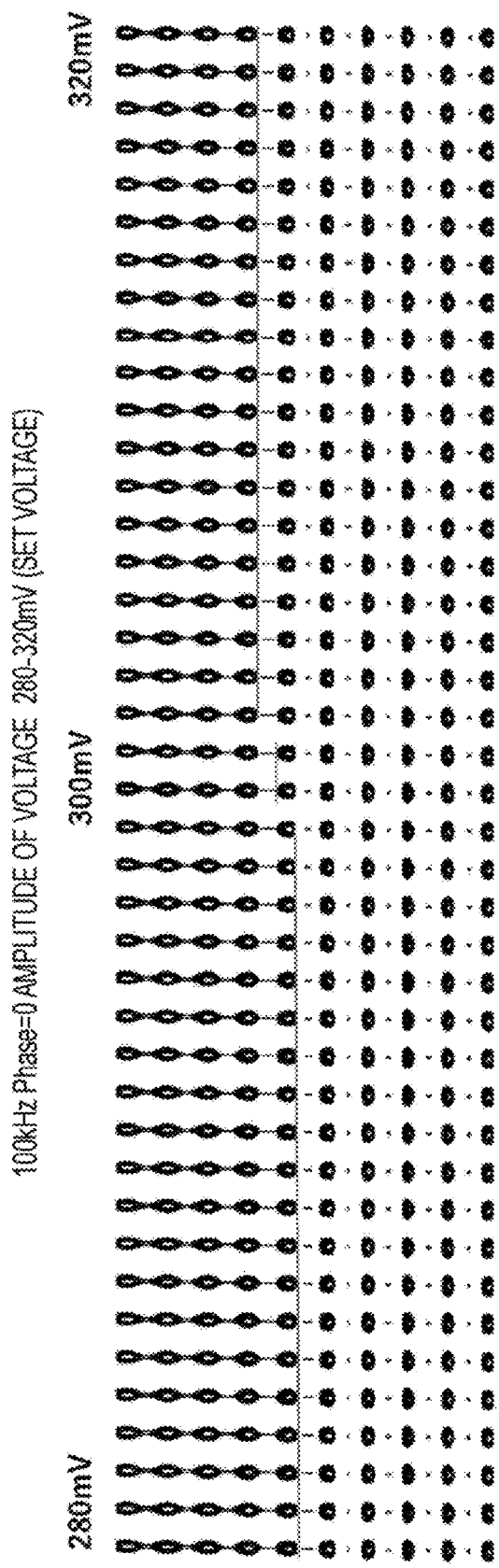

FIG. 9 is an image in which the voltages of the vibration element 111 and the states of separation of the droplet D are arranged, and is an image for each set voltage 1 mV of the vibration element 111.

Figure 10:
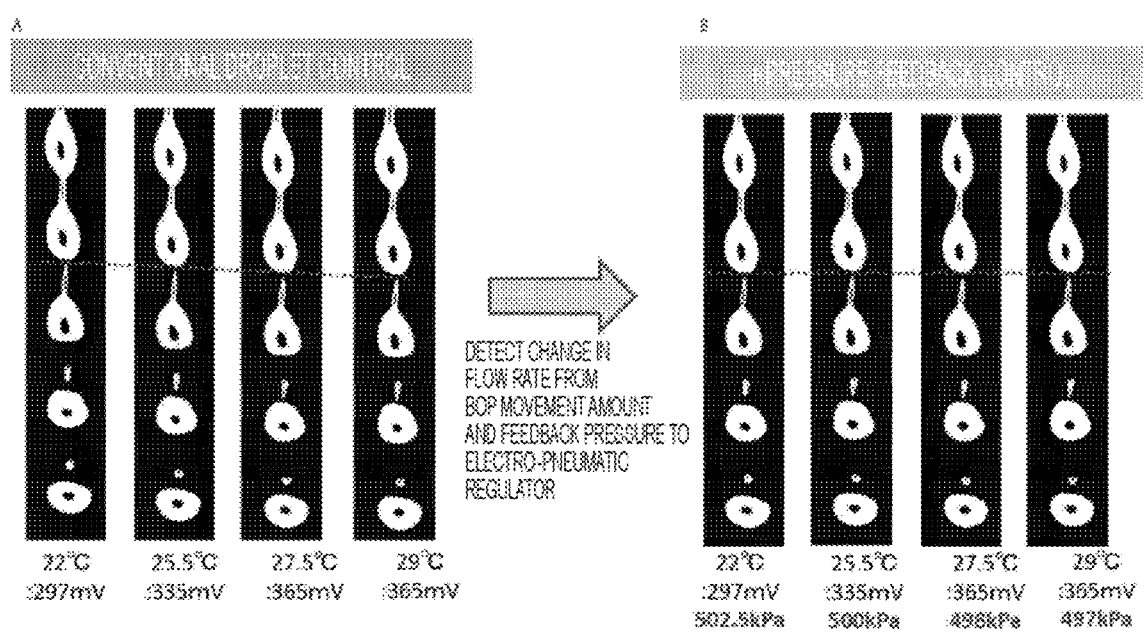

A of FIG. 10 is a droplet image in a temperature change in the case of using a conventional droplet control method (method of adjusting the voltage of the vibration element), and B of FIG. 10 is a droplet image in a temperature change in the case of being controlled by a break-off control unit 18 of the present technology.

Figure 11:
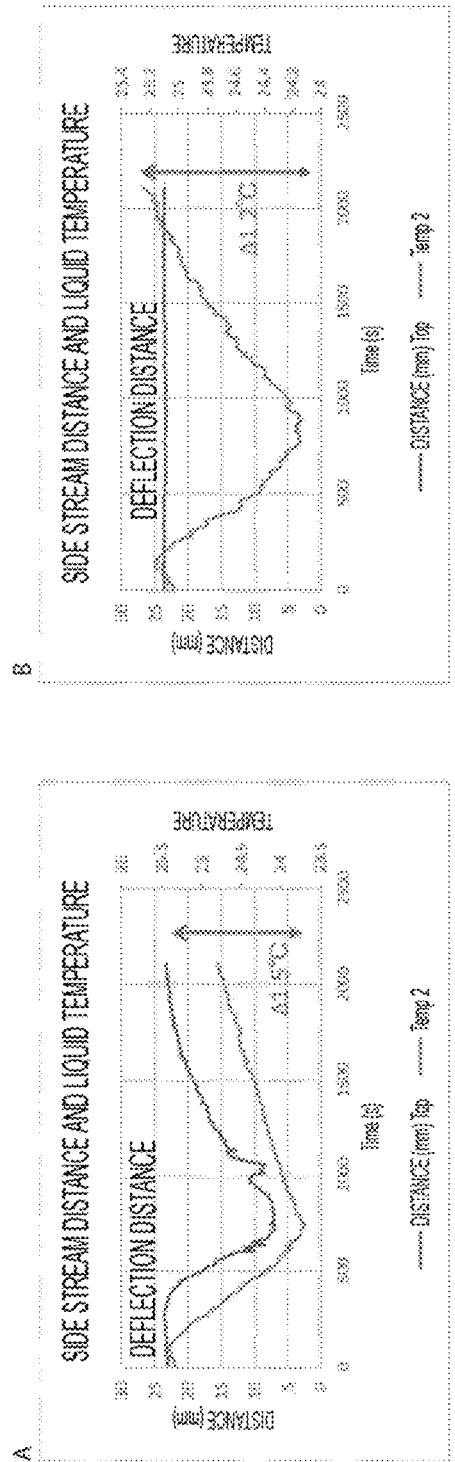

FIG. 11 illustrates graphs each illustrating a relationship between a distance between side streams and a liquid temperature when a test is performed with a high-speed droplet of 100 kHz in a case where outside air temperature changes by changing the setting of an air conditioner to 26° C., 23° C., and 26° C., A is a graph illustrating a relationship between a distance between side streams and a liquid temperature in a case where a conventional particle analyzer is used, and B is a graph illustrating a relationship between a distance between side streams and a liquid temperature in a case where the particle analyzer according to the present technology is used.

Figure 12:
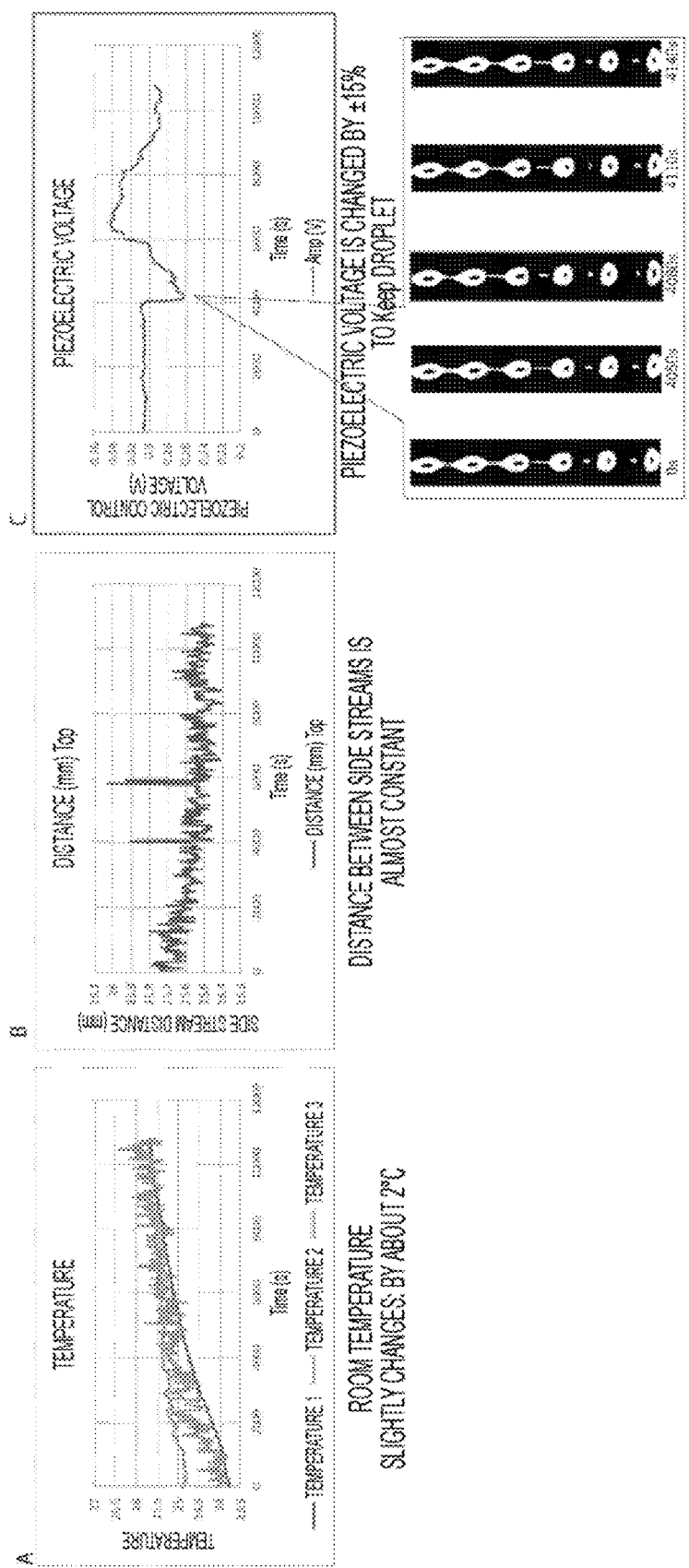

FIG. 12 illustrates graphs illustrating a temperature change (FIG. 12A), a distance between side streams (FIG. 12B), and a voltage change of the vibration element 111 (FIG. 12C) when a test is performed with a high-speed droplet of 100 kHz by using the particle analyzer 1 according to the present technology.

Figure 13:
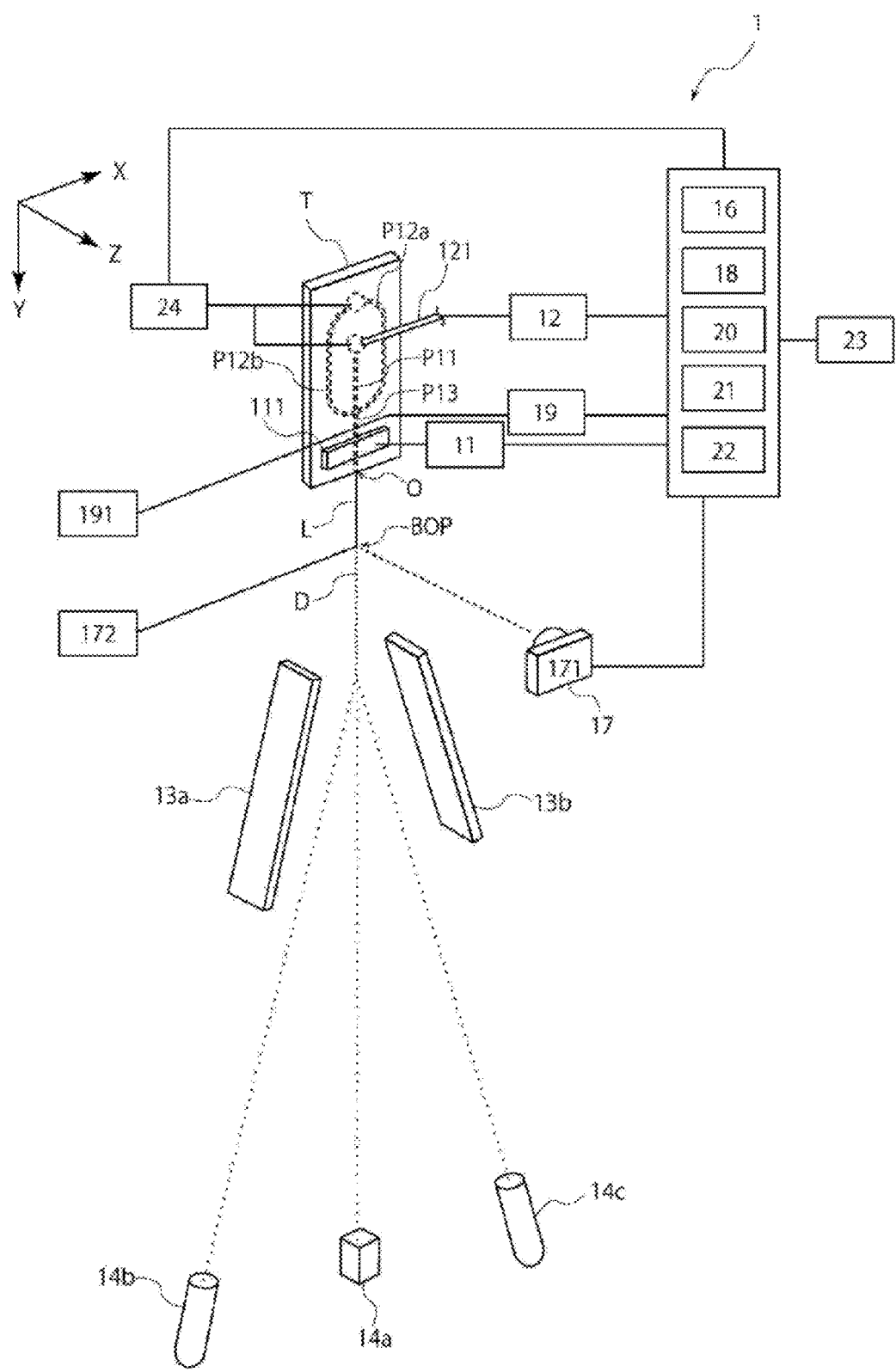

FIG. 13 is a schematic view illustrating a second embodiment of the particle analyzer 1 according to the present technology.

Figure 14:
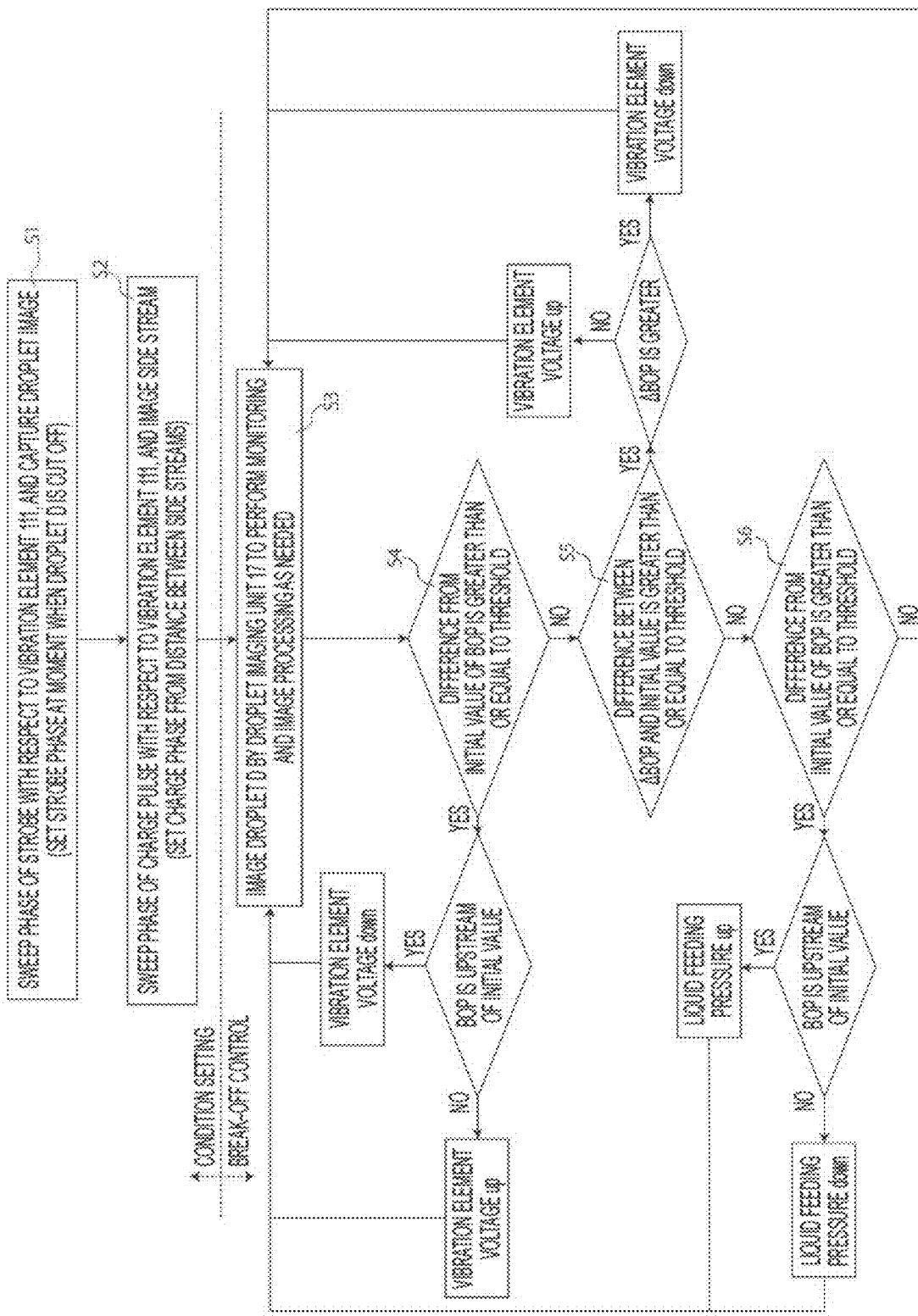

FIG. 14 is a flowchart of condition setting and a control method for stably generating droplets D in the particle analyzer 1 according to the present technology.

MODE FOR CARRYING OUT THE INVENTION

Preferred embodiments for implementing the present technology will be described below with reference to the drawings.

Embodiments hereinafter described illustrate examples of a representative embodiment of the present technology, and the scope of the present technology is not narrowed by this. Note that the description will be given in the following order.

1. Particle analyzer 1
   [First Embodiment]
   (1) Flow path P
   (2) Vibration unit 11
   (3) Charging unit 12
   (4) Deflection plates 13a, 13b
   (5) Recovery vessels 14a to 14c
   (6) Side stream imaging unit 15
   (7) Charging control unit 16
   (8) Droplet imaging unit 17
   (9) Break-off control unit 18
      (9-1) Adjustment of coupled state between droplet D and liquid column L and/or distance between droplet D and liquid column L
      (9-2) Control of break-off position of droplet D
   (10) Detection unit 19
   (11) Analysis unit 20
   (12) Storage unit 21
   (13) Display unit 22
   (14) User interface 23
   (15) Others
   [Second Embodiment]
   (1) Liquid feeding pressure adjustment unit 24
   [Control Flow]
   (1) Condition setting
   (2) Break-off control
2. Particle analysis method
   [First Embodiment]
   [Second Embodiment]

1. Particle Analyzer 1

First Embodiment

Figure 1:
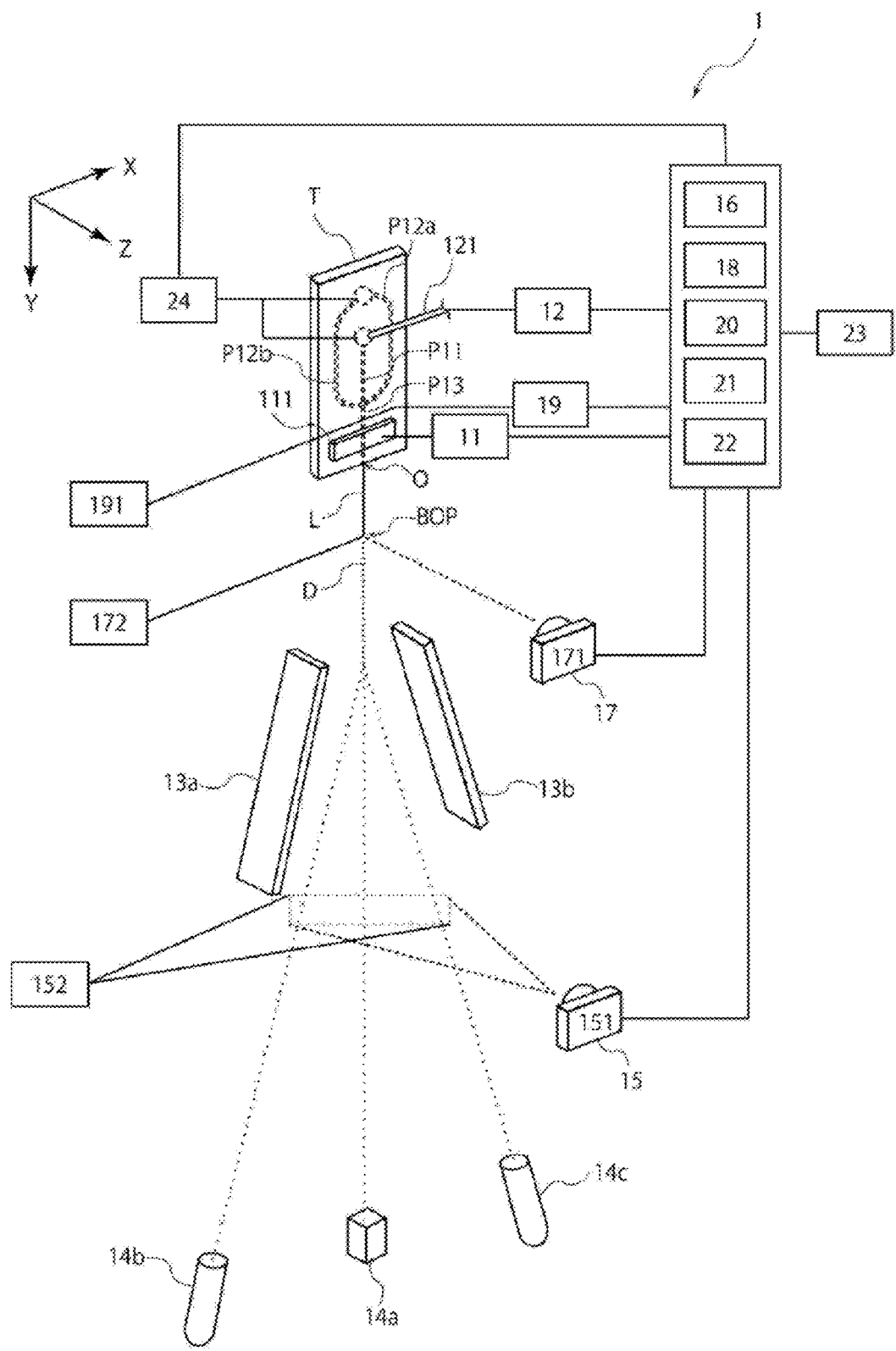
FIG. 1 is a schematic view illustrating a first embodiment of a particle analyzer 1 according to the present technology.

FIG. 1 is a schematic view illustrating a first embodiment of a particle analyzer 1 according to the present technology. The particle analyzer 1 (flow cytometer) according to the first embodiment includes at least a vibration unit 11, a charging unit 12, a side stream imaging unit 15, and a charging control unit 16. Furthermore, as necessary, a flow path P, deflection plates 13a and 13b, recovery vessels 14a to 14c, a droplet imaging unit 17, a break-off control unit 18, a detection unit 19, an analysis unit 20, a storage unit 21, a display unit 22, a user interface 23 or the like, and a liquid feeding pressure adjustment unit 24 or the like may be provided. Each unit will be described in detail below.

(1) Flow Path P(P11, P12a, P12b, P13)

The flow path P allows passage of a fluid including a sample flow which contains particles and a sheath flow which flows so as to include the sample flow. Although the flow path P may be provided in advance in the particle analyzer 1 according to the present technology, it is also possible that a disposable chip T or the like provided with the flow path P is installed in the particle analyzer 1 to perform analysis or sorting.

Figure 2:
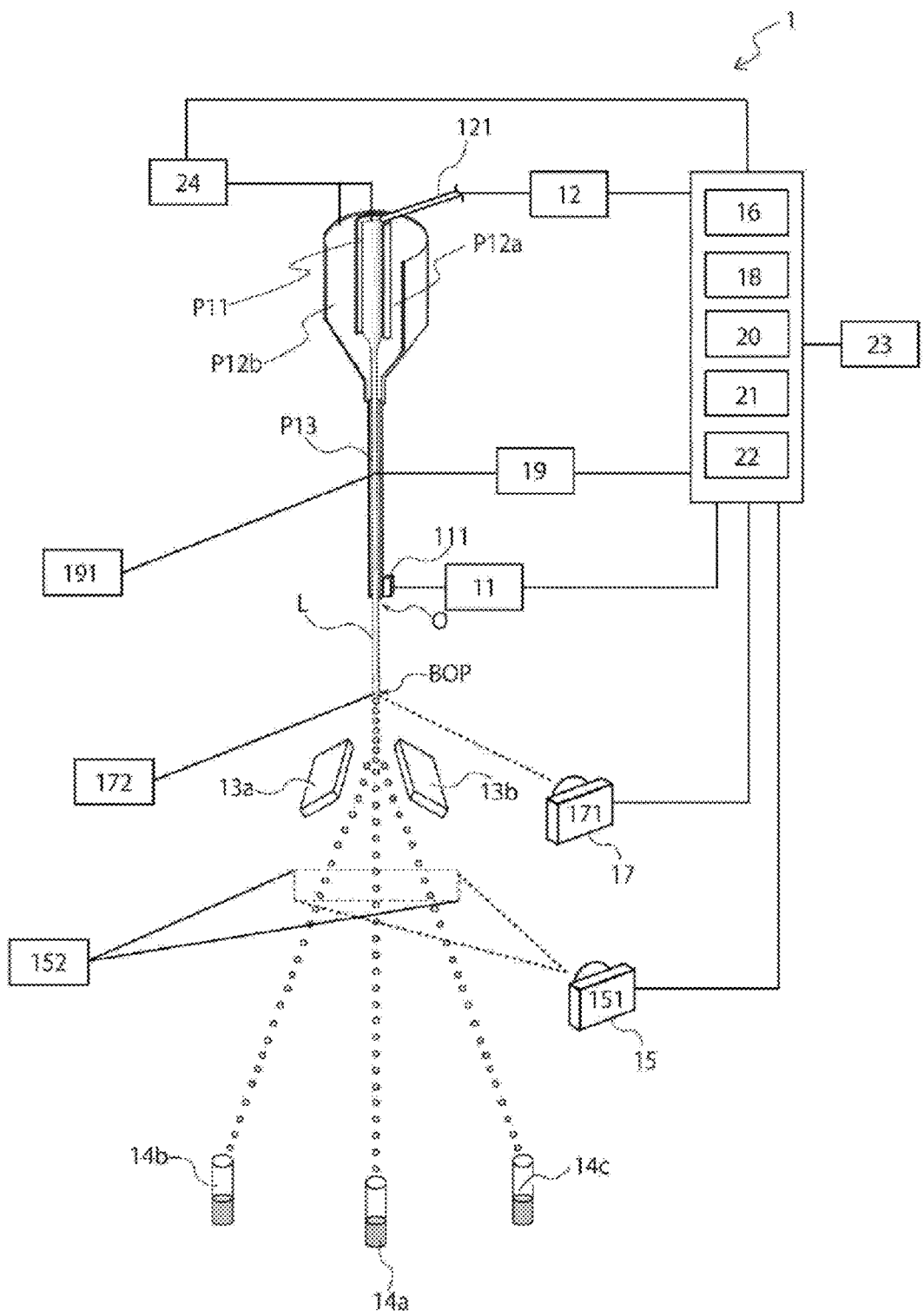
FIG. 2 is a schematic view illustrating a modification of the first embodiment of the particle analyzer 1 according to the present technology.

A form of the flow path P is not especially limited, and can be freely designed. For example, this is not limited to the flow path P formed in a two-dimensional or three-dimensional plastic or glass chip T as illustrated in FIG. 1, and as illustrated in FIG. 2 to be described later, a flow path P used in a conventional flow cytometer can also be applied to the particle analyzer 1.

Furthermore, a flow path width, a flow path depth, and a flow path cross-sectional shape of the flow path P are not especially limited as long as a laminar flow can be formed, and can be freely designed. For example, a micro flow path having a flow path width of 1 mm or smaller can also be used in the particle analyzer 1. In particular, a micro flow path having a flow path width of 10 μm or more and 1 mm or less can be suitably used in the present technology.

A method of feeding particles is not especially limited, and the particles can flow in the flow path P depending on the form of the used flow path P. For example, a case of the flow path P formed in the chip T illustrated in FIG. 1 is described. A sample liquid containing particles is introduced into a sample liquid flow path P11, and a sheath liquid is introduced into two sheath liquid flow paths P12a and P12b. The sample liquid flow path P11 and the sheath liquid flow paths P12a and P12b merge to form a main flow path P13. A sample liquid laminar flow fed in the sample liquid flow path P11 and sheath liquid laminar flows fed in the sheath liquid flow paths P12a and P12b can merge in the main flow path P13 to form a sheath flow in which the sample liquid laminar flow is sandwiched between the sheath liquid laminar flows.

The particles that flow through the flow path P can be labeled with one or two or more dyes such as fluorescent dyes. In this case, the fluorescent dyes available in the present technology include, for example, Cascade Blue, Pacific Blue, fluorescein isothiocyanate (FITC), phycoerythrin (PE), propidium iodide (PI), Texas Red (TR), peridinin chlorophyll protein (PerCP), allophycocyanin (APC), 4',6-diamidino-2-phenylindole (DAPI), Cy3, Cy5, Cy7, Brilliant Violet (BV421) and the like.

(2) Vibration Unit 11

The vibration unit 11 applies vibration to the fluid by using a vibration element 111, to form a droplet D. The vibration element 111 is preferably provided so as to be in contact with the flow path P, and more preferably provided near a fluid discharge port of the flow path P as illustrated in FIG. 1. In particular, in a case where a microchip T is used, the vibration element 111 is preferably provided near an orifice O of the microchip T described above.

The vibration element 111 is not especially limited and any well-known vibration element can be freely selected and used. Specifically, for example, a piezoelectric element or the like is used. It is possible to adjust a size of the droplet D and generate the droplet D containing a certain amount of particles by adjusting a liquid feeding amount to the flow path P, a diameter of the discharge port, the vibration frequency of the vibration element 111 and the like.

(3) Charging Unit 12

The charging unit 12 applies positive or negative electric charge to the droplet D containing the particles. In a case where the microchip T is used, electric charge is applied to the droplet D discharged from the orifice O formed in the microchip T. The droplet D can be charged by an electrode 121 electrically connected to the charging unit 12 and inserted into the sample liquid flow path P11 provided in the microchip T. In this case, it is sufficient that the electrode 121 is inserted in any portion of the microchip T so as to be in electrical contact with the sample liquid or the sheath liquid fed through the flow path P.

In the particle analyzer 1 according to the present technology, the droplet D including the particles can be charged by the charging unit 12 after a drop delay time elapses after the particles contained in the sample liquid are detected by the detection unit 19 to be described later.

(4) Deflection Plates 13a, 13b

Reference signs 13a and 13b in FIG. 1 denote a pair of deflection plates arranged to face each other with the droplet D ejected from the orifice O and imaged by the droplet imaging unit 17 to be described later interposed therebetween. The deflection plates 13a and 13b include electrodes (not illustrated) that control the moving direction of the droplet D discharged from the orifice O by electric acting force with electric charge applied to the droplet D. Furthermore, the deflection plates 13a and 13b also control the trajectory of the droplet D generated from the orifice O by electric acting force with electric charge applied to the droplet D. In FIG. 1, a facing direction of the deflection plates 13a and 13b is indicated by the X-axis direction.

(5) Recovery Vessels 14a to 14c

In the particle analyzer 1 according to the present technology, the droplet D is received in any one of the plurality of recovery vessels 14a to 14c arranged in a line in the facing direction (X-axis direction) of the deflection plates 13a and 13b. The recovery vessels 14a to 14c may be general-purpose plastic tubes or glass tubes for experiment. The number of recovery vessels 14a to 14c is not particularly limited, but a case where three recovery vessels are installed is illustrated here. The droplet D generated from the orifice O is guided to any one of the three recovery vessels 14a to 14c and recovered depending on the presence or absence of an electrical acting force between the deflection plates 13a and 13b and the magnitude thereof.

The recovery vessels 14a to 14c may be replaceably installed in a recovery vessel container (not illustrated). The recovery vessel container may be disposed, for example, on a Z-axis stage (not illustrated) configured to be movable in a direction (Z-axis direction) orthogonal to a discharge direction (Y-axis direction) of the droplet D from the orifice O and the facing direction (X-axis direction) of the deflection plates 13a and 13b.

(6) Side Stream Imaging Unit 15 (151, 152)

The side stream imaging unit 15 (151, 152) images the state of the droplet D deflected by electric charge. Reference signs 151 and 152 in FIG. 1 denote a side stream camera 151 such as a CCD camera or a CMOS sensor for imaging a state (side stream) after the droplet D discharged from the orifice O is deflected, and a light source 152 for illuminating the side stream. It is desirable that the light source 152 can illuminate a certain range so as to capture the trajectory of the side stream. Unlike a droplet camera 171 of the droplet imaging unit 17 to be described later, the side stream imaging unit 15 (151, 152) does not need to capture an instantaneous image, and it is sufficient if overlapping of images of a droplet passing at a high speed can be captured as a trajectory.

(7) Charging Control Unit 16

The charging control unit 16 controls the timing of charging the droplet D on the basis of an image captured by the side stream imaging unit 15.

A specific example of a control method in the charging control unit 16 will be described with reference to FIG. 3. FIG. 3A illustrates images obtained by sweeping the phase of a droplet charge signal with respect to the vibration element 111 and imaging a deflected droplet image with the side stream camera 151. FIG. 3B is a graph illustrating a relationship between the distance between side streams and the charge signal. In this manner, the distance between side streams can be calculated by processing an image captured by the side stream imaging unit 15, and the change with respect to the phase can be estimated, and the phase of the charge signal can be appropriately set. Specifically, for example, the phase of the charge signal can be appropriately set by calculating the distance between side streams from an image captured by the side stream imaging unit 15 and determining the phase range in which the distance between side streams is constant.

FIG. 4 illustrates graphs illustrating two examples of the charge signal output from amplifiers with different circuits for the same deflection input signal and relationships between a distance between side streams and the charge signal in a case where the respective amplifiers are used. It can be seen that the phase ranges in which the distance between side streams is constant are greatly different because the deformation amounts of the signals are different due to the different amplifiers. In order to correctly set the timing of the charge signal in such an actual use environment, it is practical to analyze the relationship between the positions of the actual side streams and the phase as in the present technology.

The charging control unit 16 can determine the timing of charging in the phase range in which the distance between side streams is constant according to the type of the satellite of the droplet D. A small droplet formed when a thin rod-shaped liquid column stretched rearward after a droplet is discharged is separated from a main droplet and a nozzle by surface tension is referred to as a "satellite", and this satellite becomes a factor of charge fluctuation of the droplet D. Therefore, for a particle analyzer that requires deflection position accuracy of the droplet D, control of the satellite is one of essential parameters.

There are four types of satellites: Slow Satellite (Back satellite), Infinity, Fast satellite (Forward satellite), and Non satellite. Slow Satellite (hereinafter referred to as "slow satellite") is a case where the lower end of a satellite is cut off and the upper end of the satellite is cut off (see FIG. 7B to be described later), Infinity is a case where the lower end and the upper end of a satellite are simultaneously cut off, Fast satellite (hereinafter referred to as "fast satellite") is a case where the upper end of a satellite is cut off and the lower end of the satellite is cut off (see FIG. 7A to be described later), and Non satellite is a case where the upper end of a satellite is cut off and the satellite is absorbed before the lower end of the satellite is cut off.

FIG. 5A is a graph illustrating a relationship between a distance between side streams and a charge signal in a case of the fast satellite. In the case of the fast satellite, since the droplet D is separated at one timing, it is preferable to set the phase of the charge signal near the center of the phase range in which the distance between side streams is constant. Since it is not possible to predict which side a change with respect to disturbance moves to, it is most stable to take margins on both sides equally.

FIG. 5B is a graph illustrating a relationship between a distance between side streams and a charge signal in a case of the slow satellite. In the case of the slow satellite, there are two points of the main droplet and the satellite as the timings at which the droplet D is separated. As illustrated in FIG. 5B, when the distance between side streams is plotted by sweeping the phase, it can be seen that there are a part that changes sharply and a part that changes gently. The part showing a rapid change is a timing to stop charging the main droplet, and the part changing gently is a timing at which the satellite is separated. The timing at which the main droplet is separated does not change as long as the timing is held in the condition setting (see reference sign S1 in FIG. 14 to be described later), but the separation timing of the satellite changes due to disturbance. In order to prevent a change in the separation timing of the satellite from affecting a side stream, it is preferable to set the condition setting of the charge phase closer to the main droplet separation timing.

FIG. 6A is a graph illustrating a distance between side streams and a temperature change in a case where a condition setting of the charge phase is set near the center of a phase range in which the distance between side streams is constant in a case of the slow satellite. FIG. 6B is a graph illustrating a distance between side streams and a temperature change in a case where the condition setting of the charge phase is set to be closer to the main droplet separation timing in the case of the slow satellite. When the temperature changes, as illustrated in FIG. 6A, under the condition that the phase margins are evenly distributed (in a case where the distance between side streams is set near the center of the phase range in which the distance between side streams is constant), the distance between side streams greatly changes. However, as illustrated in FIG. 6B, in a case where the condition setting of the charge phase is set closer to the main droplet separation timing, it can be seen that the distance between side streams is stabilized.

(8) Droplet Imaging Unit 17 (171, 172)

The droplet imaging unit 17 images the state of the droplet D before being deflected. Reference sign 171 in FIG. 1 denotes the droplet camera 171 such as a CCD camera or a CMOS sensor for imaging the droplet D. The droplet camera 171 is arranged at a location between the orifice O and the deflection plates 13a and 13b where the droplet D can be imaged. Furthermore, the droplet camera 171 can adjust the focus of the captured image of the droplet D. As a light source for imaging in the droplet camera 171, for example, a strobe 172 to be described later is used. Note that the droplet imaging unit 17 can also obtain a plurality of the photographs, and can also continuously obtain photographs within a fixed cycle. The "fixed cycle" mentioned herein is not particularly limited, and may be one cycle or a plurality of cycles to be described later. In the case of a plurality of cycles, each cycle may be temporally continuous or discontinuous.

The image captured by the droplet camera 171 is displayed on the display unit 22 such as a display to be described later, and can also be used by a user to check the formation status of the droplet D (for example, the size, shape, interval, and the like of the droplet D).

The strobe 172 may be controlled by the break-off control unit 18 to be described later. The strobe 172 includes an LED for imaging the droplet D and a laser (for example, a red laser light source) for imaging the particles, and the break-off control unit 18 switches the light source to be used according to the purpose of imaging. The specific structure of the strobe 172 is not particularly limited, and one or two or more well-known circuits or elements can be selected and freely combined.

In a case where the LED is used as the strobe 172, the LED emits light only for a very short time of one cycle of Droplet CLK. This light emission is performed for each Droplet CLK, whereby a certain moment of droplet D formation can be cut out and acquired as an image. Imaging by the droplet camera 171 is, performed for example, about 30 times per second, whereas Droplet CLK is about 10 kHz to 50 kHz, but the present technology is not limited thereto.

In a case where the laser is used as the strobe 172, the laser emits light at a cycle about a half cycle of Droplet CLK or a cycle shorter than the half cycle. At this time, only in a case where a particle is detected by the detection unit 19 to be described later, the laser emits light after a light source lighting delay time set by the break-off control unit 18 has elapsed. Therefore, the fluorescence of the particle contained in the droplet D can be acquired from an image. Imaging by the droplet camera 171 is performed about 60 times per second, and by performing measurement such that detection of particles and emission of the laser light source are performed several thousand times per second, stable particles in which fluorescence of about several tens of particles is accumulated can acquire an image. Note that the laser emission time may be any time as long as a stable particle image can be acquired.

The droplet imaging unit 17 can set a strobe timing according to the type of the satellite of the droplet D. FIG. 7 illustrates examples of a droplet image, in which A illustrates an example of the fast satellite, and B illustrates an example of the slow satellite. In the case of the fast satellite, it is preferable to set the strobe timing immediately after a satellite SD is separated from a liquid column L. More specifically, it is preferable to set the strobe timing so as to be able to image a state in which the tail-shaped satellite SD is separated and a minute gap is observed between the satellite SD and the liquid column L. In contrast, in the case of the slow satellite, it is preferable to set the strobe timing immediately after a main droplet MD is separated from a liquid column L. More specifically, it is preferable to set the strobe timing so as to be able to image a state in which the main droplet MD is separated and a minute gap is observed between the main droplet MD and the liquid column L. The gap between the liquid column L and the droplet D is preferably set to be as small as possible within an observable range. Alternatively, by mechanically setting the condition that the gap is 0, highly sensitive control can be performed similarly.

(9) Break-Off Control Unit 18

The break-off control unit 18 controls break-off of the droplet D on the basis of an image captured by the droplet imaging unit 17. Specifically, by adjusting the voltage of the vibration element 111 and/or the liquid feeding pressure of the fluid on the basis of the break-off timing of the droplet D specified by a plurality of images captured by the droplet imaging unit 17, the coupled state between the droplet D and the liquid column L and/or the distance between the droplet D and the liquid column L, and the break-off position of the droplet D can be controlled.

(9-1) Adjustment of Coupled State Between Droplet D and Liquid Column L and/or Distance Between Droplet D and Liquid Column L FIG. 8A is an example of a droplet image captured by the droplet imaging unit 17, and FIG. 8B is a graph illustrating a characteristic amount (break of the droplet D) obtained from the droplet image. If the liquid column L and the droplet D are coupled, the break-off point (BOP) greatly changes. In this case, by increasing the voltage of the vibration element 111, it is possible to perform control so as to promote separation of the droplet D. In contrast, in a case where the distance (ABOP) between the liquid column L and the droplet D increases, the distance (ABOP) between the liquid column L and the droplet D can be controlled by lowering the voltage of the vibration element 111.

FIG. 9 is an image in which the voltages of the vibration element 111 and the states of separation of the droplet D are arranged, and is an image for each set voltage 1 mV of the vibration element 111. As illustrated in FIG. 9, by adjusting the voltage of the vibration element 111, the coupled state between the droplet D and the liquid column L and/or the distance between the droplet D and the liquid column L can be controlled.

(9-2) Control of Break-Off Position of Droplet D

FIG. 10A is a droplet image in a temperature change in the case of using a conventional droplet control method (method of adjusting only the voltage of the vibration element), and FIG. 10B is a droplet image in a temperature change in the case of being controlled by the break-off control unit 18 of the present technology. If the delicate adjustment of the droplet separation position changing depending on the temperature is to be performed only by the voltage of the vibration element 111, on the contrary, the droplet separation timing is collapsed in some cases. This is considered to be mainly due to a change in liquid velocity. Therefore, in the present technology, the break-off position of the droplet D can be controlled by adjusting the liquid feeding pressure of the fluid.

Feedback is performed to the liquid feeding pressure adjustment unit 24 to be described later so as to hold the break-off position of the droplet D on the basis of an image captured by the droplet imaging unit 17, and the liquid feeding pressure of the fluid is adjusted by the liquid feeding pressure adjustment unit 24, so that very highly accurate flow rate management can be performed. By performing this control, it is also possible to keep the flow rate in the flow path P, which slightly changes due to the temperature, dust, bubbles, and the like in the flow path P, constant. By stabilizing the flow rate of the fluid with high accuracy, it is possible to improve detection performance of scattered light, fluorescence, and the like in the detection unit 19 to be described later, and furthermore, it is also expected to improve setting accuracy of a lag time (delay time) from detection in the detection unit 19 to charging in the charging unit 12.

As described above, the break-off control unit 18 can control both the coupled state of the droplet D and the liquid column L and/or the distance between the droplet D and the liquid column L by adjusting the voltage of the vibration element 111 and the break-off position of the droplet D by adjusting the liquid feeding pressure of the fluid. In this case, it is preferable to adjust the liquid feeding pressure of the fluid after adjusting the voltage of the vibration element 111.

FIG. 11 illustrates graphs each illustrating a relationship between a distance between side streams and a liquid temperature when a test is performed with a high-speed droplet of 100 kHz in a case where the outside air temperature is changed to 26° C., 23° C., and 26° C. FIG. 11A is a graph illustrating a relationship between a distance between side streams and a liquid temperature in a case where a conventional particle analyzer is used. FIG. 11B is a graph illustrating a relationship between a distance between side streams and a liquid temperature in a case where the particle analyzer 1 according to the present technology is used. As illustrated in FIG. 11A, in the case of using the conventional particle analyzer, the distance between side streams varies with the change in the liquid temperature. In contrast, as illustrated in FIG. 11B, in the case of using the particle analyzer 1 according to the present technology, it can be seen that the distance between side streams is kept constant for 30 minutes or more even if the liquid temperature varies.

Furthermore, FIG. 12 illustrates graphs illustrating a temperature change (FIG. 12A), a distance between side streams (FIG. 12B), and a voltage change of the vibration element 111 (FIG. 12C) when a test is performed with a high-speed droplet of 100 kHz by using the particle analyzer 1 according to the present technology. As illustrated in FIG. 12B, it can be seen that there is no change in a side stream deflection distance in a long time of 3 hours in spite of the high-speed droplet of 100 kHz. Furthermore, as illustrated in FIG. 12C, during this period, the control voltage of the vibration element 111 has changed by about 15%, and the importance of feedback control can be seen.

As described above, by controlling the timing of charging by the charging control unit 16 at the time of setting up the particle analyzer and feedback-controlling break-off of the droplet D by the break-off control unit 18 at the time of particle analysis, it is possible to perform highly accurate particle analysis and sorting even under high-speed droplet and environmental variations such as flow rate, temperature, and humidity.

(10) Detection Unit 19

Reference sign 19 in FIG. 1 denotes the detection unit 19 that detects measurement target light generated from particles such as cells by irradiation of laser emitted from the light source 191. The detection unit 19 detects particles in the fluid flowing in the flow path P. The detection unit 19 detects the characteristics of the particles flowing through the main flow path P13. The characteristic detection is not particularly limited, but for example, in the case of optical detection, scattered light and fluorescence generated from particles fed in a line at the center of three-dimensional laminar flow in the main flow path P13 are detected by the detection unit 19 by irradiation of the particles with laser.

In this light irradiation and detection, in addition to the laser light source, an irradiation system such as a condenser lens, a dichroic mirror, or a bandpass filter for condensing laser and irradiating a cell with laser may also be configured. A detection system includes, for example, a photomultiplier tube (PMT), an area imaging element such as a CCD or a CMOS element, or the like.

The measurement target light detected by the detection system of the detection unit 19 is light generated from a particle by irradiation of measurement light. Specific examples thereof include forward scattered light, side scattered light, and scattered light of Rayleigh scattering, Mie scattering, or the like. The measurement target light is converted into an electric signal and output to the break-off control unit 18 described above, the analysis unit 20, the storage unit 21, the display unit 22 to be described later, and the like, and used for determination of optical characteristics of the particle.

Note that the detection unit 19 may magnetically or electrically detect the characteristics of a cell. In this case, for example, microelectrodes are arranged in the main flow path P13 of the microchip T so as to face each other, and a resistance value, a capacity value (capacitance value), an inductance value, an impedance, a change value of an electric field between the electrodes, or magnetization, a change in magnetic field, a change in flux density, or the like can be measured.

(11) Analysis Unit 20

The analysis unit 20 is connected to the detection unit 19 and analyzes a detection signal obtained from the particle detected by the detection unit 19.

For example, the analysis unit 20 can correct detection values of light received from the detection unit 19 and calculate the characteristic amounts of each particle. Specifically, the characteristic amounts indicating a size, a form, an internal structure, and the like of the particle are calculated from detection values of received fluorescence, forward scattered light, and backward scattered light. Furthermore, a sorting control signal can also be generated by performing sorting determination on the basis of the calculated characteristic amounts, a sorting condition received in advance from the user interface 23, and the like.

The analysis unit 20 is not indispensable in the particle analyzer 1 according to the present technology, and it is also possible to analyze the state and the like of a particle by using an external analysis device and the like on the basis of the detection values of light detected by the detection unit 19. Furthermore, the analysis unit 20 may be connected to each unit of via a network.

(12) Storage Unit 21

The storage unit 21 can store all items related to particle analysis such as values detected by the detection unit 19, the characteristic amounts calculated by the analysis unit 20, a sorting control signal, and a sorting condition input by the user interface 23.

In the particle analyzer 1, the storage unit 21 is not indispensable, and an external storage device may be connected. As the storage unit 21, for example, a hard disk or the like can be used. Furthermore, a recording unit 9 may be connected to each unit via a network.

(13) Display Unit 22

The display unit 22 can display all items related to analysis such as values detected by the detection unit 19. For example, the display unit 22 displays, as a scattergram, the characteristic amounts for each particle calculated by the analysis unit 20. Furthermore, it is also possible to display an image captured by the side stream imaging unit 15, an image captured by the droplet imaging unit 17, and the like.

In the particle analyzer 1 according to the present technology, the display unit 22 is not indispensable, and an external display device may also be connected. As the display unit 22, for example, a display, a printer, and the like may be used.

(14) User Interface 23

The user interface 23 is a part to be operated by a user such as an operator. The user can access each unit through the user interface 23 and control each unit of the particle analyzer 1 according to the present technology. For example, the user interface 23 can set a region of interest on the scattergram displayed on the display unit 22, and determine a sorting condition.

In the particle analyzer 1 according to the present technology, the user interface 23 is not indispensable, and an external operating device may be connected. As the user interface 23, for example, a mouse, a keyboard, and the like may be used.

(15) Others

Note that, in the present technology, it is possible to store a function performed in each unit of the particle analyzer 1 according to the present technology in a personal computer and a hardware resource provided with a control unit including a CPU and the like, a recording medium (for example, a nonvolatile memory (for example, a USB memory or the like), HDD, CD and the like) and the like as a program, and allow the same to function by the personal computer or the control unit.

Second Embodiment

FIG. 13 is a schematic view illustrating a second embodiment of the particle analyzer 1 according to the present technology. The particle analyzer 1 (flow cytometer) according to the second embodiment includes at least a vibration unit 11, a charging unit 12, a droplet imaging unit 17, and a liquid feeding pressure adjustment unit 24. Furthermore, as necessary, a flow path P, deflection plates 13a and 13b, recovery vessels 14a to 14c, a break-off control unit 18, a detection unit 19, an analysis unit 20, a storage unit 21, a display unit 22, a user interface 23, and the like may be provided. Each unit will be described in detail below.

Note that the vibration unit 11, the charging unit 12, the droplet imaging unit 17, the flow path P, the deflection plates 13a and 13b, the recovery vessels 14a to 14c, the break-off control unit 18, the detection unit 19, the analysis unit 20, the storage unit 21, the display unit 22, and the user interface 23 are the same as those of the first embodiment described above, and thus the description thereof is herein omitted.

(1) Liquid Feeding Pressure Adjustment Unit 24

In the liquid feeding pressure adjustment unit 24, the liquid feeding pressure of the fluid is adjusted on the basis of the timing at which a droplet D specified by a plurality of images captured by the droplet imaging unit 17 is broken off. The liquid feeding pressure may be adjusted by adjusting one or both of a sample flow flowing through a sample liquid flow path P11 and a sheath liquid flowing through sheath liquid flow paths P12a and P12b, but it is preferable to adjust the liquid feeding pressure of the sheath liquid flowing through the sheath liquid flow paths P12a and P12b.

The break-off position of the droplet D can be controlled by adjusting the liquid feeding pressure of the fluid by the liquid feeding pressure adjustment unit 24. By controlling the break-off position of the droplet D, particle sorting accuracy can be further improved.

Furthermore, the flow rate of the fluid can be controlled by adjusting the liquid feeding pressure of the fluid by the liquid feeding pressure adjustment unit 24. It is also possible to keep the flow rate in the flow path P, which slightly changes due to the temperature, dust, bubbles, and the like in the flow path P, constant. By stabilizing the flow rate of the fluid with high accuracy, it is possible to improve detection performance of scattered light, fluorescence, and the like in the detection unit 19, and furthermore, it is also expected to improve setting accuracy of a lag time (delay time) from detection in the detection unit 19 to charging in the charging unit 12.

Note that, although FIG. 13 illustrates an example in which a side stream imaging unit 15 and a charging control unit 16 are not provided, the side stream imaging unit 15 and the charging control unit 16 described in the first embodiment can also be provided in the second embodiment.

[Control Flow]

FIG. 14 is a flowchart of condition setting and a control method for stably generating the droplets D in the particle analyzer 1 according to the present technology.

(1) Condition Setting

First, the phase of observation strobe illumination 172 with respect to a vibration element 111 is adjusted such that a droplet image captured by a droplet camera 171 of the droplet imaging unit 17 shows a state immediately after droplet separation (S1). In this state, the phase of a droplet charge signal with respect to the vibration element 111 is swept, and a deflected droplet image is captured with a camera 151 of the side stream imaging unit 15. For the relationship between the distance between side streams and a charge signal, a graph is created, and the phase of the charge signal is appropriately set (S2). If the condition setting is performed in this manner so that the droplet separation timing obtained from the droplet imaging unit 17 can be maintained, it is expected that the position of the side stream is stabilized.

(2) Break-Off Control

The image obtained by the droplet camera 171 in the condition setting is an image immediately after the droplet separation. In this state, particles are analyzed and sorted while monitoring and image processing the state of the droplet as needed by the droplet imaging unit 17 (S3). In a case where the difference from the initial value of the break-off point (BOP) is greater than or equal to a preset threshold, for example, a large jump (one droplet or satellite) occurs due to an environmental change or the like (S4), the voltage of the vibration element 111 is lowered in a case where the BOP becomes upstream of the initial value. In contrast, in a case where the BOP is downstream of the initial value, the voltage of the vibration element 111 is increased. In a case where the difference is less than the preset threshold (S4), the distance (ABOP) between a liquid column L and the droplet D is measured. In a case where the difference between ABOP and an initial value is greater than or equal to a preset threshold (for example, 1 pix) (S5), the voltage of the vibration element 111 is lowered in a case where ABOP is greater than the initial value. In contrast, in a case where the ABOP is smaller than the initial value, the voltage of the vibration element 111 is increased.

By the control of S4 and S5, in a captured droplet image, the droplet D and the liquid column L are kept in a state of repeating bonding and separation. In such a state, since the influence of a minute environmental change or the like can be observed as a large change from the image, the timing of droplet separation can be accurately maintained. Furthermore, immediately after the droplet D is cut off, the common condition that the distance between the liquid column L and the droplet D is zero regardless of the size, shape, and type of the droplet D is realized, so that the same algorithm can be applied to various conditions.

After the voltage control of the vibration element 111, the difference from the initial value of the break-off point (BOP) is further calculated, and in a case where the difference is greater than or equal to a preset threshold (S6), the liquid feeding pressure is increased in a case where the BOP is upstream of the initial value. In contrast, in a case where the BOP is downstream of the initial value, the liquid feeding pressure is lowered. As described above, after the voltage control of the vibration element 111, the liquid feeding pressure is further controlled, and the feedback control of the break-off point of the droplet D is performed, whereby the flow rate of the fluid can be stabilized with high accuracy in addition to improvement of particle sorting accuracy. By stabilizing the flow rate of the fluid, it is possible to improve detection performance of scattered light, fluorescence, and the like in the detection unit 19, and furthermore, it is also expected to improve setting accuracy of a lag time (delay time) from detection in the detection unit 19 to charging in the charging unit 12.

2. Particle Analysis Method

First Embodiment

A particle analysis method according to the first embodiment is a method of performing at least a droplet formation step, a charging step, a side stream imaging step, and a charging control step. Furthermore, if necessary, a particle flowing step, a recovery step, a droplet imaging step, a break-off control step, a detection step, an analysis step, a storage step, a display step, a liquid feeding pressure adjustment step, and the like may be performed. Note that since the specific procedure performed in each step is similar to the procedure performed by each unit of the particle analyzer 1 according to the first embodiment, the description thereof is omitted here.

Second Embodiment

A particle analysis method according to the second embodiment is a method of performing at least a droplet formation step, a charging step, a droplet imaging step, and a liquid feeding pressure adjustment step. Furthermore, if necessary, a particle flowing step, a recovery step, a droplet imaging step, a break-off control step, a detection step, an analysis step, a storage step, a display step, a liquid feeding pressure adjustment step, and the like may be performed. Moreover, it is also possible to perform a side stream imaging step and a charging control step. Note that since the specific procedure performed in each step is similar to the procedure performed by each unit of the particle analyzer 1 according to the second embodiment, the description thereof is omitted here.

Note that the present technology may also take the following configuration.

(1)

A particle analyzer including:
 a vibration unit that applies vibration to a fluid to form a droplet, the fluid including a sample flow which contains a particle and a sheath flow which flows so as to include the sample flow;
 a charging unit that applies electric charge to the droplet including the particle;
 a side stream imaging unit that images a state of the droplet deflected by the electric charge; and
 a charging control unit that controls a timing of charging from an image captured by the side stream imaging unit.

(2)

The particle analyzer according to (1), in which the charging control unit calculates a distance between side streams from an image captured by the side stream imaging unit, and determines a phase range in which the distance is constant.

(3)

The particle analyzer according to (2), in which the charging control unit determines the timing of the charging in the phase range according to a type of a satellite of the droplet.

(4)

The particle analyzer according to (3), in which in a case where the satellite is a fast satellite, the charging control unit determines the timing of the charging near a center in the phase range.

(5)

The particle analyzer according to (3), in which in a case where the satellite is a slow satellite, the charging control unit determines the timing of the charging on a main droplet separation side in the phase range.

(6)

The particle analyzer according to any one of (1) to (5) further including:
 a droplet imaging unit that images a state of a droplet before being deflected; and
 a break-off control unit that controls break-off of the droplet from an image captured by the droplet imaging unit.

(7)

The particle analyzer according to (6), in which the break-off control unit adjusts a voltage of the vibration unit and/or a liquid feeding pressure of the fluid on the basis of a timing of break-off of the droplet specified by a plurality of images captured by the droplet imaging unit.

(8)

The particle analyzer according to (7), in which the break-off control unit adjusts a coupled state between the droplet and a liquid column and/or a distance between the droplet and the liquid column by adjusting the voltage of the vibration unit.

(9)

The particle analyzer according to (7), in which the break-off control unit controls a break-off position of the droplet by adjusting the liquid feeding pressure of the fluid.

(10)

The particle analyzer according to any one of (7) to (9), in which the break-off control unit adjusts the liquid feeding pressure of the fluid after adjusting the voltage of the vibration unit.

(11)

The particle analyzer according to any one of (6) to (10), in which the droplet imaging unit sets a strobe timing according to a type of a satellite of the droplet.

(12)

The particle analyzer according to (11), in which in a case where the satellite is a fast satellite, the droplet imaging unit sets the strobe timing immediately after the satellite is separated from a liquid column.

(13)

The particle analyzer according to (11), in which in a case where the satellite is a slow satellite, the droplet imaging unit sets the strobe timing immediately after a main droplet is separated from a liquid column.

(14)

A particle analysis method including: a droplet formation step of applying vibration to a fluid by using a vibration element to form a droplet, the fluid including a sample flow which contains a particle and a sheath flow which flows so as to include the sample flow;
a charging step of applying electric charge to the droplet including the particle;
a side stream imaging step of imaging a state of the droplet deflected by the electric charge; and
a charging control step of controlling a timing of charging on the basis of an image captured in the side stream imaging step.

(15)

A particle analyzer including: a vibration unit that applies vibration to a fluid to form a droplet, the fluid including a sample flow which contains a particle and a sheath flow which flows so as to include the sample flow;
a charging unit that applies electric charge to the droplet including the particle;
a droplet imaging unit that images a state of a droplet before being deflected; and
a liquid feeding pressure adjustment unit that adjusts a liquid feeding pressure of the fluid on the basis of a timing of break-off of the droplet specified by a plurality of images captured by the droplet imaging unit.

(16)

The particle analyzer according to (15), in which a break-off position of the droplet is controlled by adjusting the liquid feeding pressure of the fluid by the liquid feeding pressure adjustment unit.

(17)

The particle analyzer according to (15) or (16), in which a flow rate of the fluid is controlled by adjusting the liquid feeding pressure of the fluid by the liquid feeding pressure adjustment unit.

REFERENCE SIGNS LIST

1 Particle analyzer
P Flow path
P11 Sample liquid flow path
P12a, P12b Sheath liquid flow path
P13 Main flow path
11 Vibration unit
111 Vibration element
T Microchip
12 Charging unit
121 Electrode
O Orifice
13a, 13b Deflection plate
14a to 14c Recovery vessel
15 Side stream imaging unit
151 Side stream camera
152 Light source
16 Charging control unit
17 Droplet imaging unit
171 Droplet camera
172 Strobe
18 Break-off control unit
19 Detection unit
191 Light source
20 Analysis unit
21 Storage unit
22 Display unit
23 User interface
24 Liquid feeding pressure adjustment unit

The invention claimed is:

1. A particle analyzer comprising:
a vibration unit that applies vibration to a fluid including a sample flow which contains a particle and a sheath flow which flows so as to include the sample flow;
a charging unit that applies electric charge to a droplet including the particle, the droplet being formed by the vibration;
a side stream imaging unit that images a state of the droplet deflected by the electric charge; and
a charging control unit that controls a timing of charging on a basis of an image captured by the side stream imaging unit
wherein the charging control unit calculates a distance between side streams from an image captured by the side stream imaging unit, and determines a phase range in which the distance is constant.

2. The particle analyzer according to claim 1, wherein the charging control unit determines the timing of the charging in the phase range according to a type of a satellite of the droplet.

3. The particle analyzer according to claim 2, wherein in a case where the satellite is a fast satellite, the charging control unit determines the timing of the charging near a center in the phase range.

4. The particle analyzer according to claim 2, wherein in a case where the satellite is a slow satellite, the charging control unit determines the timing of the charging on a main droplet separation side in the phase range.

5. The particle analyzer according to claim 1 further comprising:
a droplet imaging unit that images a state of a droplet before being deflected; and
a break-off control unit that controls break-off of the droplet on a basis of an image captured by the droplet imaging unit.

6. The particle analyzer according to claim 5, wherein the break-off control unit adjusts a voltage of the vibration unit and/or a liquid feeding pressure of the fluid on a basis of a timing of break-off of the droplet specified by a plurality of images captured by the droplet imaging unit.

7. The particle analyzer according to claim 6, wherein the break-off control unit adjusts a coupled state between the droplet and a liquid column and/or a distance between the droplet and the liquid column by adjusting a voltage of the vibration unit.

8. The particle analyzer according to claim 6, wherein the break-off control unit controls a break-off position of the droplet by adjusting the liquid feeding pressure of the fluid.

9. The particle analyzer according to claim 6, wherein the break-off control unit adjusts the liquid feeding pressure of the fluid after adjusting the voltage of the vibration unit.

10. The particle analyzer according to claim 5, wherein the droplet imaging unit sets a strobe timing according to a type of a satellite of the droplet.

11. The particle analyzer according to claim 10, wherein in a case where the satellite is a fast satellite, the droplet imaging unit sets the strobe timing immediately after the satellite is separated from a liquid column.

12. The particle analyzer according to claim 10, wherein in a case where the satellite is a slow satellite, the droplet imaging unit sets the strobe timing immediately after a main droplet is separated from a liquid column.

13. A particle analysis method comprising:
- a vibration step of applying vibration to a fluid including a sample flow which contains a particle and a sheath flow which flows so as to include the sample flow;
- a charging step of applying electric charge to a droplet including the particle, the droplet being formed by the vibration;
- a side stream imaging step of imaging a state of the droplet deflected by the electric charge; and
- a charging control step of controlling a timing of charging on a basis of an image captured in the side stream imaging step
- wherein the charging control unit calculates a distance between side streams from an image captured by the side stream imaging unit, and determines a phase range in which the distance is constant.

* * * * *